US008627477B2

(12) United States Patent
Chen et al.

(10) Patent No.: US 8,627,477 B2
(45) Date of Patent: Jan. 7, 2014

(54) METHOD, APPARATUS, AND SYSTEM FOR DETECTING A ZOMBIE HOST

(75) Inventors: Xu Chen, Beijing (CN); Shuo Shen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/238,680

(22) Filed: Sep. 21, 2011

(65) Prior Publication Data
US 2012/0011589 A1 Jan. 12, 2012

Related U.S. Application Data

(63) Continuation of application No. PCT/CN2010/071151, filed on Mar. 19, 2010.

(30) Foreign Application Priority Data

Mar. 23, 2009 (CN) .......................... 2009 1 0106341

(51) Int. Cl.
*H04L 29/06* (2006.01)
(52) U.S. Cl.
USPC .......................................................... 726/24
(58) Field of Classification Search
USPC .......................................................... 726/24
See application file for complete search history.

(56) References Cited

U.S. PATENT DOCUMENTS

| | | | |
|---|---|---|---|
| 7,760,640 B2 * | 7/2010 | Brown et al. .................. 370/235 |
| 8,056,132 B1 * | 11/2011 | Chang et al. ..................... 726/23 |
| 2003/0046577 A1 * | 3/2003 | Silverman ...................... 713/200 |
| 2006/0107318 A1 * | 5/2006 | Jeffries et al. ..................... 726/22 |
| 2007/0097976 A1 * | 5/2007 | Wood et al. ..................... 370/392 |
| 2007/0192855 A1 * | 8/2007 | Hulten et al. ..................... 726/22 |
| 2008/0005316 A1 | 1/2008 | Feaver |
| 2008/0080518 A1 * | 4/2008 | Hoeflin et al. ............ 370/395.42 |
| 2009/0006569 A1 * | 1/2009 | Morss et al. ................... 709/206 |
| 2010/0162350 A1 * | 6/2010 | Jeong et al. ........................ 726/1 |
| 2010/0313264 A1 * | 12/2010 | Xie et al. ........................ 726/22 |
| 2011/0320816 A1 * | 12/2011 | Yao et al. ....................... 713/171 |

FOREIGN PATENT DOCUMENTS

| | | |
|---|---|---|
| CN | 101360019 A | 2/2009 |
| EP | 1739921 | 1/2007 |
| WO | WO2010/108422 A1 | 9/2010 |

OTHER PUBLICATIONS

Wang et al. An Advanced Hybrid Peer-to-Peer Botnet Dependable and Secure Computing, HotBots' 07, First Workshop on Hoti Topics in Understanding Botnets, Usenix, The Advanced, Computing Systems Association, Apr. 10, 2007, Cambridge, MA http://static.usenix.org/event/hotbots07.

(Continued)

*Primary Examiner* — Michael S McNally
(74) *Attorney, Agent, or Firm* — Leydig, Voit & Mayer, Ltd.

(57) ABSTRACT

The present invention relates to the communications field, and in particular, to a detection method, an apparatus, and a network with detection functions. The present invention solves the problem that the Botnet cannot be detected on a current communication network. The detection method is used to detect a Botnet and includes: obtaining a network address translation (NAT) table; detecting a behavior plane and a communication plane of a host according to the NAT table; and performing cluster analysis on results of detection on the communication plane and the behavior plane.

17 Claims, 2 Drawing Sheets

(56) References Cited

OTHER PUBLICATIONS

Grizzard et al., "Peer-to-Peer Botnets: Overview and Case Study," Published in: Proceeding HotBots '07 Proceedings of the first conference on First Workshop on Hot Topics in Understanding Botnets, Usenix Association Berkeley, CA USA, 2007, http://dl.acm.org/citation.cfm?id=1323129.

Weizhou, Research on Detecting Botnets, China Academic Journal Electronic Publishing House, http://www.cnki.net, Nov. 22, 2007.

International Search Report issued in related PCT/CN2010/071151, Jun. 3, 2010.

Written Opinion of the International Searching Authority issued in related PCT/CN2010/071151 dated Jun. 3, 2010.

Ying, Research and Application of NAT Technique, Research and Exploration N. Laboratory, Aug. 2007.

EPO Extended European Search Report dated Jul. 18, 2012, issued in related European Application No. 10755422.2, Huawei Technologies Co., Ltd. (10 pages).

Kim et al., "A Flow-based Method for Abnormal Network Traffic Detection", *Network Operations and Management Symposium*, IEEE, Seoul, Korea, Apr. 19-23, 2004, IEEE, Piscataway, New Jersey, vol. 1, Apr. 19, 2004, pp. 599-612.

"NetFlow", Wikipedia article: anonymous, Mar. 6, 2009 (4 pages). Retrieved from the internet: http://en.wikipedia.org/w/index.php?title=NetFlow&oldid=275391012 (retrieved on Jul. 11, 2012).

"User Guide for Cisco Security MARS Local Controller—Chapter 2: Report and Mitigation Devices Overview", Jun. 20, 2007 (58 pages). Retrieved from the internet: http://www.cisco.com/univercd/cc/td/doc/product/vpn/ciscosec/mars/4_2/uglc/cfgover.pdf (retrieved on Jul. 11, 2012).

1st Office Action in corresponding Chinese Patent Application No. 200910106341.6 (Feb. 26, 2013).

* cited by examiner

METHOD, APPARATUS, AND SYSTEM FOR DETECTING A ZOMBIE HOST

CROSS-REFERENCE TO RELATED APPLICATIONS

This application is a continuation of International Application No. PCT/CN2010/071151, filed on Mar. 19, 2010, which claims priority to Chinese Patent Application No. 200910106341.6, filed on Mar. 23, 2009, both of which are hereby incorporated by reference in their entireties.

FIELD OF THE INVENTION

The present invention relates to the communications field, and in particular, to a method, an apparatus, and a system for detecting a zombie host.

BACKGROUND OF THE INVENTION

The Botnet is the biggest threat to current networks of operators. Most distribution denial of service (DDoS) attacks are initiated by the Botnet and pose great threats to telecom operators and their users. A controlled zombie host becomes a hotbed for malicious websites and junk mails, and also causes great information disclosures and economic losses.

Among the conventional Botnet detection technologies, an effective technology is behavior-based detection. This technology uses a single host as the detection target, detects a communication plane and a behavior plane, and performs cluster analysis on detection results. Then, the technology performs correlation analysis to judge whether the single host is infected and determine abnormal activities performed by the single host if the single host is infected. The detection on the communication plane focuses on data streams, and detects the communication features of the Internet Protocol (IP) layer and transport layer. The detection on the behavior plane judges, according to various behaviors of the single host, whether the host performs such suspicious behaviors as downloading malicious software, scanning, and sending malicious software or a junk mail, and then judges whether the host is infected. This technology is used to observe and analyze various behaviors of a single host or other network devices, and make a judgment according to the network communication behaviors of the host. However, when a network address translation (NAT) device exists, the access side of an operator cannot identify a single host on a private network from a user gateway. Therefore, it cannot be determined that network behaviors are initiated by one host on a private network.

SUMMARY OF THE INVENTION

Embodiments of the present invention provide a method, an apparatus, and a system for detecting a zombie host to solve the technical problem that a zombie host on a private network equipped with a NAT device cannot be detected on current communication networks.

An implementation of an embodiment of the present invention for solving the preceding technical problem is: providing a detection method. The method includes obtaining a NAT table; detecting a behavior plane and a communication plane of a host according to the NAT table; and analyzing results of detection on the behavior plane and the communication plane of the host to judge whether the host is a zombie host.

Another implementation of an embodiment of the present invention for solving the preceding technical problem is as follows: A detection apparatus is configured to detect a Botnet and includes a NAT log server, a Netflow collector, and a network behavior log server. The NAT log server is configured to maintain a NAT table. The Netflow collector is configured to: maintain a communication plane flow table, compare a data time stamp with a time stamp of the NAT table, and determine translation entries to be matched. The network behavior log server is configured to: maintain a behavior plane attack alarm table, search the NAT table for entries that match a source IP address, a source port, and a NAT device identity (ID), and translate the source IP address and the source port into a public IP address and port according to the NAT table.

Another implementation of an embodiment of the present invention for solving the preceding technical problem is as follows: A detection system includes at least one host on an internal private network and at least one detection apparatus located at the edge of an Internet service provider (ISP) network. When the host on the private network accesses the ISP network, the detection apparatus is configured to detect network behaviors of the host to judge whether the host is a zombie host.

By using the detection system and detection method provided in embodiments of the present invention, the problem that the host on the private network cannot be confirmed from the operator side in a NAT scenario is solved. Thereby, Botnet detection solutions can be provided for operators.

DETAILED DESCRIPTION OF THE EMBODIMENTS

Figure 1:
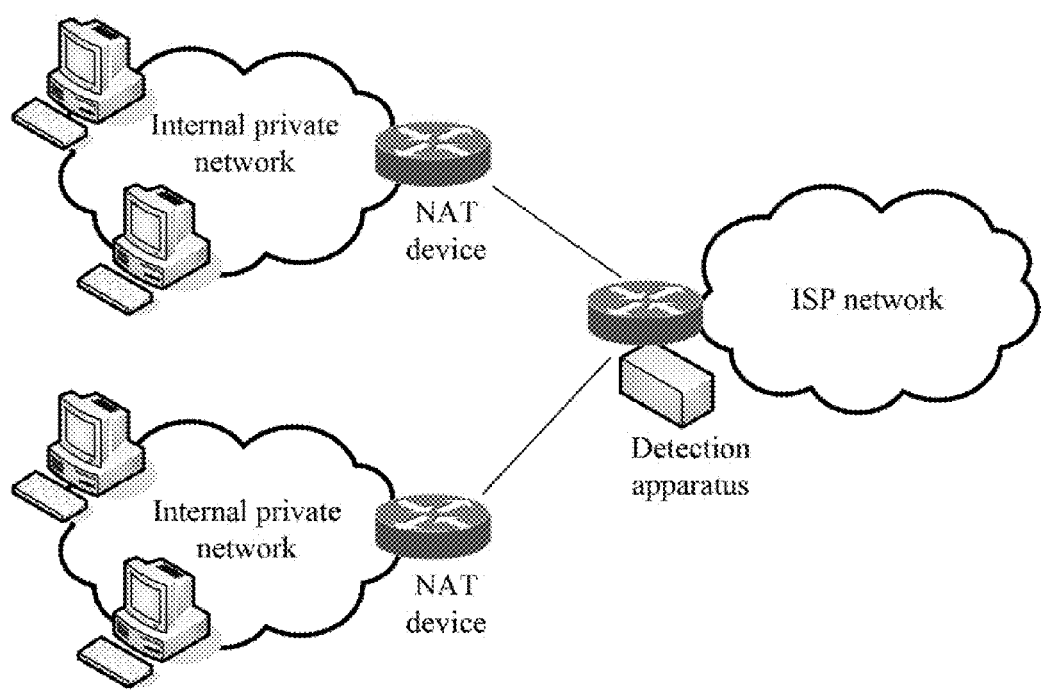
FIG. 1 is a schematic structural diagram of a network/system with detection functions according to an embodiment of the present invention.

The following describes the implementation process of the present invention with reference to exemplary embodiments.

NAT is a network address translation technology that permits a whole institution to appear on the Internet with a public Internet Protocol (IP) address. This technology translates an internal private IP address into a public IP address. With the NAT technology, an internal private IP address is used on an internal network such as an Intranet, and when an internal node needs to communicate with external networks, the internal private IP address is replaced by a public IP address, so that the public IP address is normally used on external public networks. NAT enables multiple computers to share the Internet connection, which solves the problem of public IP addresses shortage.

There are three types of NAT, namely, static NAT, pooled NAT, and network address port translation (NAPT).

Static NAT is the simplest and easiest to set and implement. It permanently maps the internal IP address of each host on an internal network to a legal IP address on an external network. Pooled NAT defines a series of legal addresses on the external network, and maps the legal addresses to the internal network by using a dynamic allocation method. NAPT maps internal addresses to different ports of an IP address on the external network.

Pooled NAT translates only IP addresses, and allocates a temporary external IP address to each internal IP address. Pooled NAT is mainly applied to dial-up and frequent remote connections. After a remote user is connected, pooled NAT may allocate an IP address to the remote user; when the user is disconnected, the IP address may be released and reserved for future use.

NAPT is a well-known translation mode. NAPT is generally applied in access devices, and may hide a small- and middle-sized network behind a legal IP address. Different from pooled NAT, NAPT maps an internal connection to an independent IP address on the external network, and adds a TCP port number selected by the NAT device to the IP address. When NAPT is used on the Internet, all different information flows seem to come from the same IP address. This merit enables NAPT to be practical in small offices. A small office may request an IP address from an Internet Service Provider (ISP) and connect multiple computers to the Internet through NAPT.

In an embodiment of the present invention, the NAT device on the user side has a mapping table (or other forms of mapping) between a host ID and an IP address (a port number may be added if NAPT is applied). The IP address is a public IP address used by the host to perform external communication through the NAT device. The NAT device is a gateway or a firewall. The host ID includes a media access control (MAC) address of the host, a user name or an internal private IP address. The detection apparatus on the operator side is deployed or integrated with the edge router on the ISP network. The detection apparatus on the operator side needs to cluster and detect behaviors of each host to judge whether the host is a zombie host. The NAT device shares the NAT mapping with the detection apparatus on the operator side, so that the detection apparatus can categorize network behaviors by using the host ID.

FIG. 1 is a schematic structural diagram of a network with detection functions according to an embodiment of the present invention. As shown in FIG. 1, the network includes at least one internal private network and at least one ISP network. The host on the internal private network accesses the ISP network through the NAT device and the edge router of the ISP network. The network further includes a detection apparatus. The detection apparatus is deployed or integrated with the edge router of the ISP network, and is configured to detect the network behaviors of the host accessing the ISP network to judge whether the host is a zombie host.

FIG. 1 illustrates a detection system according to an embodiment of the present invention. The detection system is configured to detect a Botnet. The system includes at least one host on an internal private network and at least one detection apparatus located at the edge of the ISP network. When the host on the private network accesses the ISP network, the detection apparatus is configured to detect network behaviors of the host to judge whether the host is a zombie host.

Figure 2:
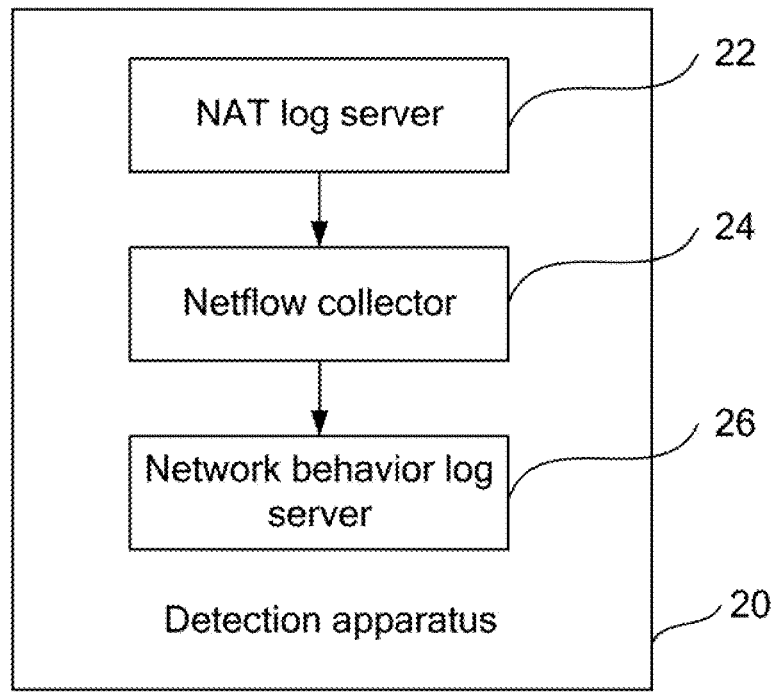
FIG. 2 is a schematic structural diagram of a detection apparatus according to an embodiment of the present invention.

As shown in FIG. 2, the detection apparatus includes a NAT log server, a Netflow collector, and a network behavior log server.

The NAT log server is configured to maintain a NAT table, that is, the mapping table between a host ID and an IP address. The IP address is a public IP address used by the host to perform external communication through the NAT device. The maintenance of the NAT table includes adding or deleting the mapping table between an internal private network host ID and the public IP address and recording such information as the start and end time of the address translation and the NAT device ID.

The Netflow collector is configured to maintain a communication plane flow table and perform statistical analysis, for example, classification and clustering.

The network behavior log server is configured to maintain a behavior plane attack alarm table that carries information such as downloading and spreading malicious software, scanning, and sending a junk mail.

Optionally, the NAT log server is further configured to age the NAT table periodically. The aging time of old entries should be longer than that of the flow cache.

Optionally, the Netflow collector is further configured to compare the data time stamp with the time stamp of the NAT table, and determine translation entries to be matched in the NAT table.

Optionally, the network behavior log server is further configured to search the NAT table for entries that match the source IP address, source port, and NAT device ID according to the attack alarm table, and translate the source IP address and the source port into the public IP address and port according to the NAT table.

In addition, the network behavior log server performs correlation analysis on the analysis results of the communication plane (which receives the Netflow) and abnormal records of the behavior plane (which receives the attack alarm); if entries are matched, the network behavior log server increases flow information or alarm information; otherwise, the network behavior log server creates entries.

The zombie host may be located on the internal private network behind NAT. The unique ID of the zombie host may be restored through the mapping of the NAT. This case usually occurs under the following condition: After a user host on the internal private network is offline, the <IP, Port> pair leased by the user host in the NAT external network is released. A new user host on the internal private network is online, and leases the same <IP, Port> pair in the NAT address pool. Seen from the detection apparatus on the external network, this <IP, Port> pair in the NAT address pool is unchanged, but the actual host on the internal private network is already changed. Because the Botnet detection takes a long time, the user host on the internal private network may go online or offline frequently if the time is calculated by the day. The unique ID of the user host on the internal private network may be restored through the NAT mapping. This ID uniquely identifies the zombie host, and is used to detect the zombie host. It serves as an auxiliary function of the Botnet detection. The unique ID of the user host may be the MAC address of the host, internal private IP address or user name.

Figure 3:
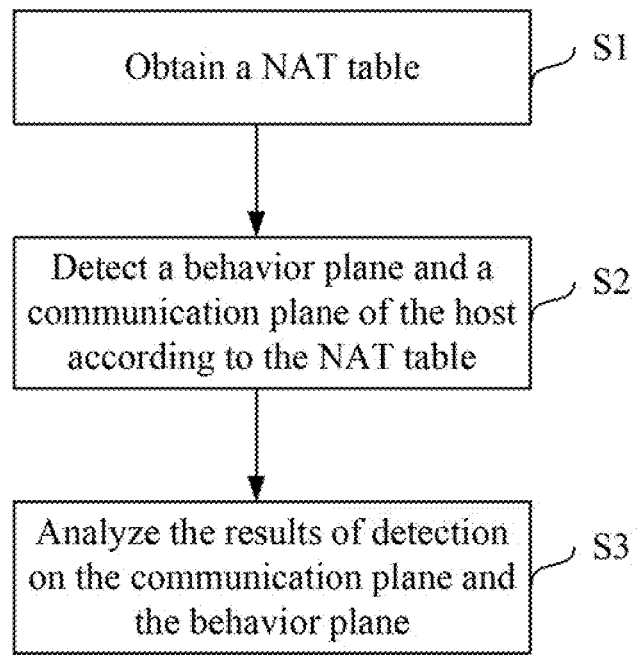
FIG. 3 is a schematic flowchart of a detection method according to an embodiment of the present invention.

FIG. 3 is a schematic flowchart of a detection method according to an embodiment of the present invention. The method includes the following steps:

S1. Obtain a NAT table.

The detection apparatus obtains the NAT table. For example, the detection apparatus may obtain a mapping table between an internal private network host ID and an IP address from the NAT device, where the IP address is a public IP address used by the host to perform external communication through the NAT device.

S2. Detect a behavior plane and a communication plane of the host according to the NAT table.

The detection apparatus detects the behavior plane of the host according to the mapping table. For example, according to various behaviors of a single host, the detection apparatus judges whether the host is engaged in such suspicious behaviors as downloading malicious software, scanning, and sending malicious software or a junk mail, and then judges whether the host is infected as a zombie host.

The detection apparatus uses data streams as the detection target, and checks the communication plane, for example, the communication features of the network layer and transport layer. The detection on the communication plane may be implemented by using the Netflow technology. The Netflow technology measures and counts IP data streams passing through a network device. It can record the traffic passing through the network device (for example, a router). The recorded features include a quintuple, time stamp or other contents in the packet header. The recorded data streams may be combined according to the quintuple or other features. The data streams recorded by the network device (for example, the router) may be cached in the Netflow device; after a certain amount of stream data is collected, the stream data is sent to the Netflow server through User Datagram Protocol (UDP) packets.

S3. Analyze the results of detection on the communication plane and the behavior plane.

Cluster analysis is performed on the results of detection on the communication plane and the behavior plane, followed by correlation analysis. In this way, whether the single host is infected is judged and the abnormal activities carried out by the infected single host are determined.

On the behavior plane, the traffic features of the zombie IP stream are extracted after exceptions are detected through deep packet inspection (DPI). Because the communication plane includes all the IP traffic, the IP streams are clustered into several types on the communication plane, with each type having a traffic feature. The features of zombie IP streams detected on the behavior plane are compared with the features of IP streams on the communication plane; if the features are similar, zombie IP streams may also exist on the communication plane.

In addition, whether the host is infected may be judged through independent Botnet detection and analysis on the behavior plane.

By using the detection system and detection method provided in embodiments of the present invention, whether the host on the private network is a zombie host can be confirmed from the operator side in a NAT scenario. Thereby, Botnet detection solutions can be provided for operators.

Based on the preceding description of embodiments, it is understandable to those skilled in the art that the present invention may be implemented through software in addition to a necessary universal hardware platform or through hardware only. In most circumstances, the former is preferred. Therefore, the essence of the technical solution of the present invention or the contributions to the prior art may be embodied as a software product. The software product is stored in a storage medium, and includes several instructions that enable a computer device (a personal computer, a server, or a network device) to perform the methods provided in the embodiments of the present invention.

The above descriptions are merely exemplary embodiments of the present invention, but not intended to limit the scope of the present invention. Any modification, equivalent replacement, or improvement made without departing from the spirit and principle of the present invention should fall within the protection scope of the present invention. Therefore, the scope of the present invention is subject to the appended claims.

What is claimed is:

1. A method for detecting a zombie host by an operator network located externally to a user side network, comprising:

obtaining a network address translation (NAT) table;
detecting, by a detection apparatus on the operator network, a behavior plane and a communication plane of a host on a user-side network according to the NAT table; and
analyzing a result of detecting the behavior plane and the communication plane of the host according to the NAT table to judge whether the host is the zombie host,
wherein the analyzing the result further comprises:
comparing features of zombie IP streams detected on the behavior plane with features of IP streams detected on the communication plane, and
determining that the zombie IP streams exist on the communication plane when the compared features of the zombie IP streams and the compared features of the IP streams are the same.

2. The method of claim 1, wherein the NAT table is a mapping table that records mapping between an internal private network host identity (ID) and an Internet Protocol (IP) address, wherein the IP address is a public IP address used by the host to perform external communication through a NAT device.

3. The method of claim 2, wherein the host ID comprises a media access control (MAC) address of the host or a user name or an internal private IP identifier.

4. The method of claim 1, wherein the step of detecting the behavior plane and the communication plane of the host according to the NAT table comprises:
according to various behaviors of a single host, judging whether the host is engaged in suspicious behaviors, wherein the suspicious behaviors comprise at least one of the following behaviors: downloading malicious software, scanning, sending malicious software, and sending a junk mail; and
using data streams as a detection target, and checking communication features of an Internet Protocol (IP) layer and a transport layer.

5. The method of claim 1, wherein detecting the communication plane is implemented by using a Netflow technology.

6. The method of claim 1, wherein the detection apparatus is integrated with an edge router on the operator network.

7. An apparatus, located on an operator side network, for detecting a zombie host located on a user side network that is external to an operator side network, the apparatus comprising a processor and a non-transitory memory storage coupled with the processor, the non-transitory memory storage comprising:
a first module, configured to obtain a network address translation (NAT) table;
a second module, configured to detect a behavior plane and a communication plane of a host according to the NAT table; and
a third module, configured to analyze a result of detecting the behavior plane and the communication plane of the host according to the NAT table to judge whether the host is the zombie host; compare features of zombie IP streams detected on the behavior plane with features of IP streams detected on the communication plane, and determine the zombie IP streams exist on the communication plane when the compared features are the same.

8. The apparatus of claim 7, comprising a NAT log server, a Netflow collector, and a network behavior log server, wherein:
the NAT log server is configured to maintain the NAT table;
the Netflow collector is configured to: maintain a communication plane flow table, compare a data time stamp with a time stamp of the NAT table, and determine translation entries to be matched in the NAT table; and the network behavior log server is configured to: maintain a behavior plane attack alarm table, search the NAT table for entries that match a source Internet Protocol (IP) address, a source port, and a NAT device identity (ID) according to the attack alarm table, and translate the source IP address and the source port into a public IP address and port according to the NAT table.

9. The apparatus of claim 8, wherein the NAT table is a mapping table that records mapping between an internal private network host ID and an IP address, wherein the IP address is a public IP address used by the host to perform external communication through a NAT device.

10. The apparatus of claim 8, wherein the NAT log server is further configured to age the NAT table periodically, wherein the aging time of old entries is longer than that of the flow cache.

11. The apparatus of claim 7, further comprising:
an edge router on the operator network;
wherein the edge router on the operator network is integrated with the processor.

12. A network for detecting a Botnet located on an internal private network, comprising at least the internal private network, at least one Internet service provider (ISP) network external to the internal private network, and a detection apparatus located on the ISP network, wherein a host on the internal private network accesses the ISP network through a network address translation (NAT) device and an edge router of the ISP network and the detection apparatus comprises a processor and a non-transitory memory storage coupled with the processor,
the non-transitory memory storage comprises:
a first module configured to obtain a network address translation (NAT) table;
a second module configured to detect a behavior plane and a communication plane of the host according to the NAT table;

a third module configured to analyze a result of detecting the behavior plane and the communication plane of the host according to the NAT table to judge whether the host is a zombie host, compare features of zombie IP streams detected on the behavior plane with features of IP streams detected on the communication plane, and determine the zombie IP streams exist on the communication plane when the compared features are the same.

13. The network of claim 12, wherein the NAT device has a mapping table between a host identity (ID) and an IP address, wherein the IP address is a public IP address used by the host to perform external communication through the NAT device.

14. The network of claim 13, wherein the host ID comprises a media access control (MAC) address of the host or a user name.

15. The network of claim 12, wherein the detection apparatus is utilized for detecting the zombie host and configured to detect the Botnet and comprises a NAT log server, a Netflow collector, and a network behavior log server, wherein:
the NAT log server is configured to maintain the NAT table;
the Netflow collector is configured to: maintain a communication plane flow table, compare a data time stamp with a time stamp of the NAT table, and determine translation entries to be matched in the NAT table; and
the network behavior log server is configured to: maintain a behavior plane attack alarm table, search the NAT table for entries that match a source Internet Protocol (IP) address, a source port, and a NAT device identity (ID) according to the attack alarm table, and translate the source IP address and the source port into a public IP address and port according to the NAT table.

16. The network of claim 12, wherein the NAT device is a gateway or a firewall.

17. The network of claim 12, wherein the edge router on the ISP network is integrated with the detection apparatus.

* * * * *